United States Patent [19]

Faucher

[11] Patent Number: 5,515,441
[45] Date of Patent: May 7, 1996

[54] SECURE COMMUNICATION METHOD AND APPARATUS

[75] Inventor: David W. Faucher, Omaha, Nebr.

[73] Assignee: AT&T Corp., Murray Hill, N.J.

[21] Appl. No.: 241,534

[22] Filed: May 12, 1994

[51] Int. Cl.⁶ .................................................. H04L 9/30
[52] U.S. Cl. ................................ 380/30; 380/21; 380/49
[58] Field of Search ............................ 380/21, 23, 25, 380/30, 43, 49

[56] References Cited

U.S. PATENT DOCUMENTS

| | | | |
|---|---|---|---|
| 4,200,770 | 4/1980 | Hellman et al. | 380/30 |
| 4,723,284 | 2/1988 | Munck et al. | 380/25 |
| 4,868,877 | 9/1989 | Fischer | 380/25 |
| 4,885,777 | 12/1989 | Takaragi et al. | 380/30 |
| 4,956,863 | 9/1990 | Goss | 380/30 |
| 4,969,189 | 11/1990 | Ohta et al. | 380/25 |
| 5,005,200 | 4/1991 | Fischer | 380/30 |
| 5,164,988 | 11/1992 | Matyas et al. | 380/25 |
| 5,214,702 | 5/1993 | Fischer | 380/30 |
| 5,222,140 | 6/1993 | Beller et al. | 380/30 |
| 5,224,163 | 6/1993 | Gasser et al. | 380/30 |
| 5,249,230 | 9/1993 | Mihm, Jr. | 380/23 |
| 5,261,002 | 11/1993 | Perlman et al. | 380/30 |
| 5,299,263 | 3/1994 | Beller et al. | 380/30 |
| 5,349,642 | 9/1994 | Kingdon | 380/25 |
| 5,402,490 | 3/1995 | Mihm, Jr. | 380/21 |

Primary Examiner—Bernarr E. Gregory

[57] ABSTRACT

In a communication system in which a node may communicate over insecure channels with any of a plurality of terminals and may pass messages from any of the terminals to any other of the terminals, communication is secured by computing a first cryptovariable from information associated with certificates exchanged between the node and a terminal, computing a second cryptovariable from a prior-art public key exchange, and computing a session cryptovariable as a function of the first and second cryptovariables. This can be done asymmetrically, enabling a terminal to verify the security of an unattended node.

10 Claims, 9 Drawing Sheets

FIG. 5

| | TERMINAL A | TERMINAL B |
|---|---|---|
| TRANSMIT CERTIFICATE | $TC_a$ | $TC_b$ |
| RECEIVE CERTIFICATE | $TC_b$ | $TC_a$ |
| DECRYPT CERTIFICATE | $UD_{KCA}(TC_b)$ | $UD_{KCA}(TC_a)$ |
| VERIFY CERTIFICATE | $(ID_b: PK_b: T_b)$ | $(ID_a: PK_a: T_a)$ |
| SECRET RANDOM COMPONENT | $R_a$ | $R_b$ |
| PUBLIC RANDOM COMPONENT | $X^{R_a} \bmod P$ | $X^{R_b} \bmod P$ |
| ENCRYPT | $PK_b(X^{R_a} \bmod P)$ | $PK_a(X^{R_b} \bmod P)$ |
| TRANSMIT | $PK_b(X^{R_a} \bmod P)$ | $PK_a(X^{R_b} \bmod P)$ |
| RECEIVE | $PK_a(X^{R_b} \bmod P)$ | $PK_b(X^{R_a} \bmod P)$ |
| DECRYPT | $SK_a(PK_a(X^{R_b} \bmod P))$ | $SK_b(PK_b(X^{R_a} \bmod P))$ |
| COMPUTE CV | $\left(X^{R_b} \bmod P\right)^{R_a} \bmod P$ | $\left(X^{R_a} \bmod P\right)^{R_b} \bmod P$ |
| SESSION KEY | $H(CV)$ | $H(CV)$ |

FIG. 6

|  | TERMINAL A | TERMINAL B |
|---|---|---|
| TRANSMIT CERTIFICATE | $C_{KCA}(M_a)$ | $C_{KCA}(M_b)$ |
| RECEIVE CERTIFICATE | $C_{KCA}(M_b)$ | $C_{KCA}(M_a)$ |
| EXTRACT CERTIFICATE | $\{ID_b: X^{R'_b} \bmod P : (R_b, S_b)\}$ | $\{ID_a: X^{R'_a} \bmod P : (R_a, S_a)\}$ |
| VERIFY CERTIFICATE | $0 < R_b < Q_{KCA}$ | $0 < R_a < Q_{KCA}$ |
|  | $0 < S_b < Q_{KCA}$ | $0 < S_a < Q_{KCA}$ |
|  | $w = (S_b)^{-1} \bmod Q_{KCA}$ | $w = (S_a)^{-1} \bmod Q_{KCA}$ |
|  | $u1 = ((HF(M_b))w) \bmod Q_{KCA}$ | $u1 = ((HF(M_a))w) \bmod Q_{KCA}$ |
|  | $u2 = ((R_b)w) \bmod Q_{KCA}$ | $u2 = ((R_a)w) \bmod Q_{KCA}$ |
|  | $v = ((G_{KCA})^{u1}(Y_{KCA})^{u2}) \bmod P_{KCA}$ | $v = ((G_{KCA})^{u1}(Y_{KCA})^{u2}) \bmod P_{KCA}$ |
|  | $R_b = v \bmod Q_{KCA}$ | $R_a = v \bmod Q_{KCA}$ |
| COMPUTE $CV_1$ | $\left(X^{R'_b} \bmod P\right)^{R'_a} \bmod P$ | $\left(X^{R'_a} \bmod P\right)^{R'_b} \bmod P$ |
| SECRET RANDOM COMPONENT | $R_a$ | $R_b$ |
| PUBLIC RANDOM COMPONENT | $X^{R_a} \bmod P$ | $X^{R_b} \bmod P$ |
| TRANSMIT | $X^{R_a} \bmod P$ | $X^{R_b} \bmod P$ |
| RECEIVE | $X^{R_b} \bmod P$ | $X^{R_a} \bmod P$ |
| COMPUTE $CV_2$ | $\left(X^{R_b} \bmod P\right)^{R_a} \bmod P$ | $\left(X^{R_a} \bmod P\right)^{R_b} \bmod P$ |
| SESSION KEY | $H(CV_1) + H(CV_2)$ | $H(CV_1) + H(CV_2)$ |

FIG. 7

| | CBIC | NBIC |
|---|---|---|
| SECRET RANDOM COMPONENT | $R_a'$ | |
| PUBLIC RANDOM COMPONENT | $X^{R_a'} \bmod P$ | |
| TRANSMIT | $X^{R_a'} \bmod P$ | |
| RECIEVE | | $X^{R_a'} \bmod P$ |
| SELECT RANDOM COMPONENT | $X^{R_b'} \bmod P = PTBL[RCID_i]$ | $R_b' = STBL[RCID_i]$ |
| COMPUTE $CV_1$ | $\left(X^{R_b'} \bmod P\right)^{R_a'} \bmod P$ | $\left(X^{R_a'} \bmod P\right)^{R_b'} \bmod P$ |
| SECRET RANDOM COMPONENT | $R_a$ | $R_b$ |
| PUBLIC RANDOM COMPONENT | $X^{R_a} \bmod P$ | $X^{R_b} \bmod P$ |
| TRANSMIT | $X^{R_a} \bmod P$ | $X^{R_b} \bmod P$ |
| RECEIVE | $X^{R_b} \bmod P$ | $X^{R_a} \bmod P$ |
| COMPUTE $CV_2$ | $\left(X^{R_b} \bmod P\right)^{R_a} \bmod P$ | $\left(X^{R_a} \bmod P\right)^{R_b} \bmod P$ |
| SESSION KEY | $H(CV_1) + H(CV_2)$ | $H(CV_1) + H(CV_2)$ |

FIG. 8

| | CBIC | NBIC |
|---|---|---|
| TRANSMIT CERTIFICATE | | $C_b$ |
| RECEIVE CERTIFICATE | $C_b$ | |
| DECRYPT CERTIFICATE | $UD_{KCA}(C_b)$ | |
| VERIFY CERTIFICATE | $\{ID_b: PK_b: T_b\}$ | |
| SECRET RANDOM COMPONENT | $R_a$ | $R_b$ |
| PUBLIC RANDOM COMPONENT | $X^{R_a} \bmod P$ | $X^{R_b} \bmod P$ |
| TRANSMIT | $PK_b(X^{R_a} \bmod P)$ | $X^{R_b} \bmod P$ |
| RECEIVE | $X^{R_b} \bmod P$ | $PK_b(X^{R_a} \bmod P)$ |
| DECRYPT | | $SK_b\{PK_b(X^{R_a} \bmod P)\}$ |
| COMPUTE CV | $\left(X^{R_b} \bmod P\right)^{R_a} \bmod P$ | $\left(X^{R_a} \bmod P\right)^{R_b} \bmod P$ |
| SESSION KEY | $H(CV)$ | $H(CV)$ |

FIG. 9

| | CBIC | NBIC |
|---|---|---|
| TRANSMIT CERTIFICATE | | $C_{KCA}(M_b)$ |
| RECEIVE CERTIFICATE | $C_{KCA}(M_b)$ | |
| EXTRACT CERTIFICATE | $\{ID_b: X^{R'_b} \bmod P : (R_b, S_b)\}$ | |
| VERIFY CERTIFICATE | $0 < R_b < Q_{KCA}$ | |
| | $0 < S_b < Q_{KCA}$ | |
| | $w = (S_b)^{-1} \bmod Q_{KCA}$ | |
| | $u1 = ((HF(M_b)) w) \bmod Q_{KCA}$ | |
| | $u2 = ((R_b) w) \bmod Q_{KCA}$ | |
| | $v = ((G_{KCA})^{u1} (Y_{KCA})^{u2}) \bmod P_{KCA}$ | |
| | $R_b = v \bmod Q_{KCA}$ | |
| GENERATE | | $R'_a$ |
| COMPUTE | | $X^{R'_a} \bmod P$ |
| TRANSMIT | | $X^{R'_a} \bmod P$ |
| RECEIVE | $X^{R'_a} \bmod P$ | |
| COMPUTE $CV_1$ | $\left(X^{R'_b} \bmod P\right)^{R'_a} \bmod P$ | $\left(X^{R'_a} \bmod P\right)^{R'_b} \bmod P$ |
| SECRET RANDOM COMPONENT | $R_a$ | $R_b$ |
| PUBLIC RANDOM COMPONENT | $X^{R_a} \bmod P$ | $X^{R_b} \bmod P$ |
| TRANSMIT | $X^{R_a} \bmod P$ | $X^{R_b} \bmod P$ |
| RECEIVE | $X^{R_b} \bmod P$ | $X^{R_a} \bmod P$ |
| COMPUTE $CV_2$ | $\left(X^{R_b} \bmod P\right)^{R_a} \bmod P$ | $\left(X^{R_a} \bmod P\right)^{R_b} \bmod P$ |
| SESSION KEY | $H(CV_1) + H(CV_2)$ | $H(CV_1) + H(CV_2)$ |

SECURE COMMUNICATION METHOD AND APPARATUS

RELATED APPLICATION

This application is related to application Ser. No. 08/175,066 assigned to common assignee with the present application and filed Dec. 29, 1993, now U.S. Pat. No. 5,450,493.

BACKGROUND OF THE INVENTION

1. Field of the Invention

This invention relates to communications, and particularly to secure communications conducted over insecure channels using public-key methods.

2. Description of the Related Art

Communications in many media (voice, video, facsimile, data, etc.) take place over many kinds of channels (wire, radio, fiber optics, etc.). Radio communications may easily be intercepted, and wire and fiber optic communications may be intercepted by one with the requisite knowledge and equipment.

When sensitive or proprietary information is to be communicated, means are sought to ensnare that only authorized parties are permitted to receive (and in some cases, to send) such information. Many solutions involve "scrambling" or "encrypting" the information in ways that only an authorized receiving entity should be able to restructure.

In modern cryptology it is usual for each party to a conversation or transmission to employ a security device comprising digital electronic computation means to operate on digital data (voice or video signals having first been digitized) with sophisticated mathematical algorithms. Typical methods involve the use of "cryptovariables" or "keys" known only to authorized senders and authorized receivers. A sender encrypts plaintext messages into ciphertext messages using a key, and the receiver decrypts the ciphertext using that key; interceptors, presumably not knowing the key, are unable to recover the plaintext.

Since the sender and receiver may be at considerable physical remove, logistical problems arise in propagating the keys between them; secure channels must be found for the purpose, such as couriers; such secure channels tend to be slow and expensive.

To alleviate these problems, methods known as "public key" methods have been devised wherein two entities may determine a common cryptovariable upon initiation of their communication by exchanging information based on secret parameters known only to each of them, and then performing computations involving those secret parameters. The information they exchange is known as "public keys", and is subject to interception; an interceptor, presumably without access to the aforementioned secret parameters, is unable to determine the cryptovariable and thus cannot decrypt the ensuing ciphertext.

The prior-art public key methods are, however, subject to a "man-in-the-middle attack" by a "spoofer". A spoofer may intercept a call from the calling party, and place a separate call to the intended called party, concatenating the two calls with himself "in the middle"; using the aforementioned public key methods, he establishes encrypted communication with both of them (with an extremely high probability of using different cryptovariables with each); he recovers the plaintext from one according to the appropriate cryptovariable, and re-encrypts it and passes it on to the other according to the appropriate cryptovariable, having full access to all plaintext.

SUMMARY OF THE INVENTION

The present invention guards against man-in-the-middle attack by having the parties to a communication session exchange public components derived from certificate information obtained from a trusted Key Certificate Authority, having each calculate a first cryptovariable from such certificate information, having each calculate a second cryptovariable by prior-art public key methods, and having each calculate a session cryptovariable as a function of the first and second cryptovariables. An active man-in-the-middle attacker is presumed not to have the certificate material and is thus unable to compute the first cryptovariable; an attacker who compromises the certificate material is presumed not to have access to the parameters required to compute the second cryptovariable and is thus unable to decrypt prior transmissions which he may have recorded.

The novel features of construction and operation of the invention will be more clearly apparent during the course of the following description, reference being had to the accompanying drawings wherein has been illustrated a preferred form of the device of the invention.

BRIEF DESCRIPTION OF THE DRAWINGS

FIGS. 5 through 9 depict key management schemes according to the present invention.

DESCRIPTION OF THE PREFERRED EMBODIMENTS

One finds in common use public-key cryptographic systems based on the well-known Diffie-Hellman algorithm, set forth in U.S. Pat. No. 4,200,770, issued Apr. 29, 1980 to Hellman et al.

Figure 1:
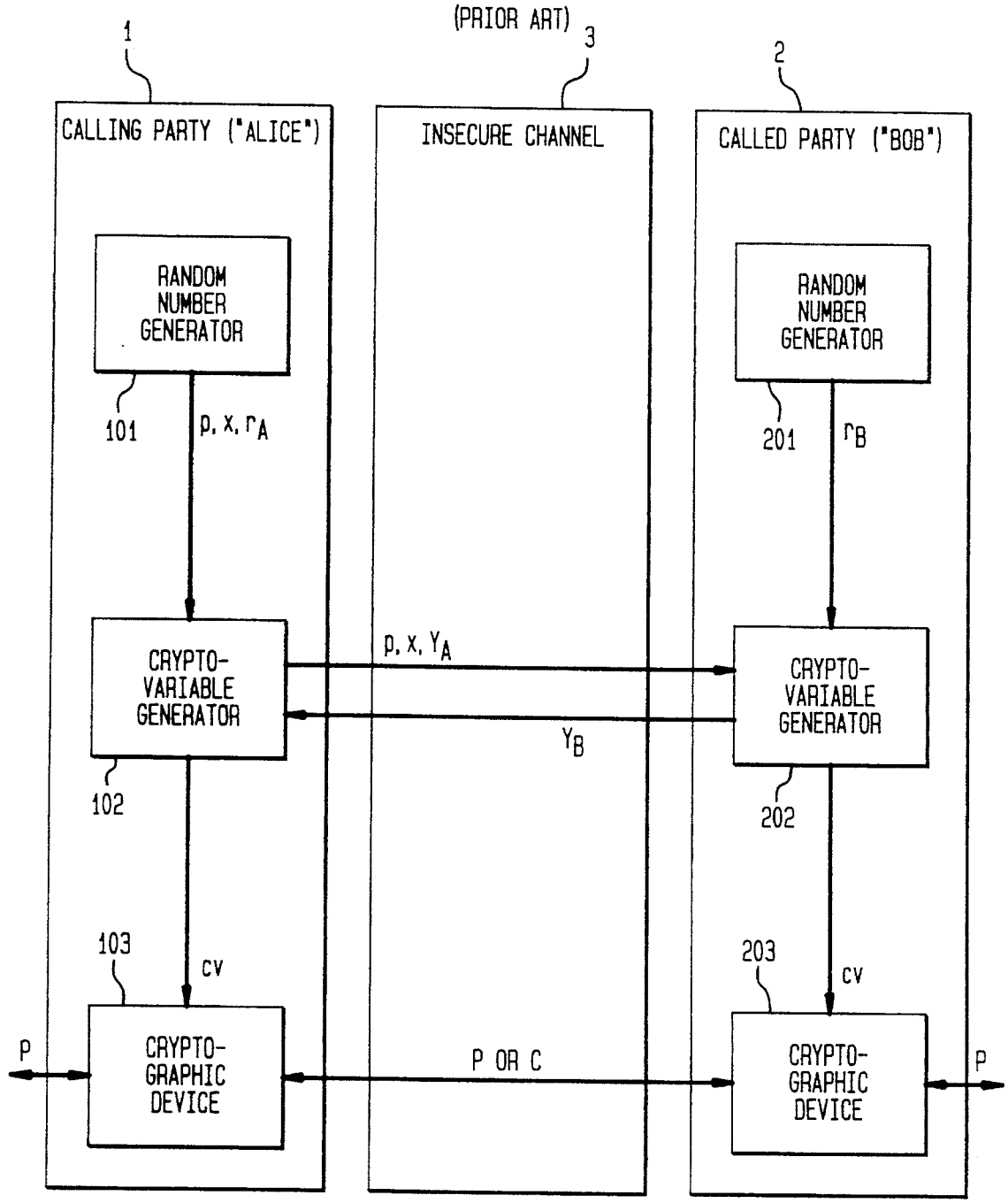
FIG. 1 schematically depicts a public-key communication system of the prior art.

FIG. 1 depicts a secure communication system of the prior art employing the Diffie-Hellman algorithm. A calling party places a voice telephone call to called party over insecure channel 3. The calling party has a security device 1 comprising digital electronic computation means, namely a random number generator 101, a cryptovariable generator 102, and a cryptographic device 103; the called party has a similar device 2. In order to attain mnemonic clarity in the ensuing discussion, calling party 1 will be referred to as "Alice" and called party 2 as "Bob", which will be correlated with subscripts "A" associated with Alice and subscripts "B" associated with Bob.

Alice and Bob are presumed to have telephone instruments (not shown) that generate digital representations of their voices, designated as the plaintext P. At the initiation of the call, Plaintext P is passed directly (i.e. without encryption) through cryptographic devices 103 and 203.

Alice's random number generator 101 provides:

p, a prime number of the form 2q+1 (where q is a prime number) and having a binary vector length N. (N is >= 512 and is typically 1024)

x, a number in the integers mod p, called the base vector $r_A$, a random number in the integers mod q; the present embodiment uses a number of at least 160 bits.

Cryptovariable generator 102 computes $$Y_A = x^{r_A} \bmod p$$

and sends p, x, and $Y_A$ over insecure channel 3 to Bob's cryptovariable generator 202. (Alternatively, p and x may have been previously agreed upon, in which case only $Y_A$ is transmitted.) It is important to note that these values are transmitted "in the clear"— i.e., encryption has not yet begun. Any eavesdropper on the channel 3 could have access to them, but could not determine $r_A$ or $r_B$ from them since the functions for computing $Y_A$ and $Y_B$ are one-way functions; i.e., it is mathematically infeasible to determine their factors or roots. (See the aforementioned Hellman patent at column 5, lines 1–41.)

Upon receipt of those values Bob's random number generator 102 provides $r_B$, a random number in the integers mod q; the present embodiment uses a number of at least 160 bits. Cryptovariable generator 202 computes $$Y_B = x^{r_B} \bmod p$$

and sends $Y_B$ over insecure channel 3 to Alice's cryptovariable generator 102.

Alice now has Bob's $Y_B$ and Bob has Alice's $Y_A$. After checking $Y_A$ and $Y_B$ for nontriviality (a spoofer may have provided a trivial value as will be discussed further below) both now compute the Diffie-Hellman variable. Cryptovariable generator 102 computes $$\begin{aligned} dh_A &= Y_B x^{r_A} \bmod p \\ &= x^{r_B} x^{r_A} \bmod p \\ &= x^{r_A r_B} \bmod p \end{aligned}$$

while cryptovariable generator 202 computes $$\begin{aligned} dh_B &= Y_A x^{r_B} \bmod p \\ &= x^{r_A} x^{r_B} \bmod p \\ &= x^{r_A r_B} \bmod p \end{aligned}$$

It is thus seen that $dh_A = dh_B$, or that Alice and Bob have both computed the same Diffie-Hellman variable. Yet an eavesdropper on the insecure channel 3 could not compute the Diffie-Hellman variable because of his lack of access to $r_A$ or $r_B$ and the aforementioned infeasibility of determining them from $Y_A$ or $Y_B$.

The Diffie Hellman variable will henceforth be referred to as dh. It is somewhat impractical to use dh directly as the cryptovariable cv, since dh is a very large number (typically 512 to 1024 bits as noted above) and as such may tend to slow down the repetitive operations of encryption and decryption. Thus, cryptovariable generators 102 and 202 will form $$cv = f_1(dh)$$

where $f_1$ is a mapping of binary vectors of length N to binary vectors of length K, where K is less than N. Typical values for K are 56 through 80.

Cryptographic devices 103 and 203 are now activated, and under control of cryptovariable cv they encrypt plaintext P into ciphertext C for transmission on insecure channel 3, and decrypt ciphertext C received from channel 3 to plaintext P. Alice and Bob may thus carry on what appears to them to be an ordinary telephone conversation, while eavesdroppers on channel 3 cannot determine the plaintext.

Figure 2:
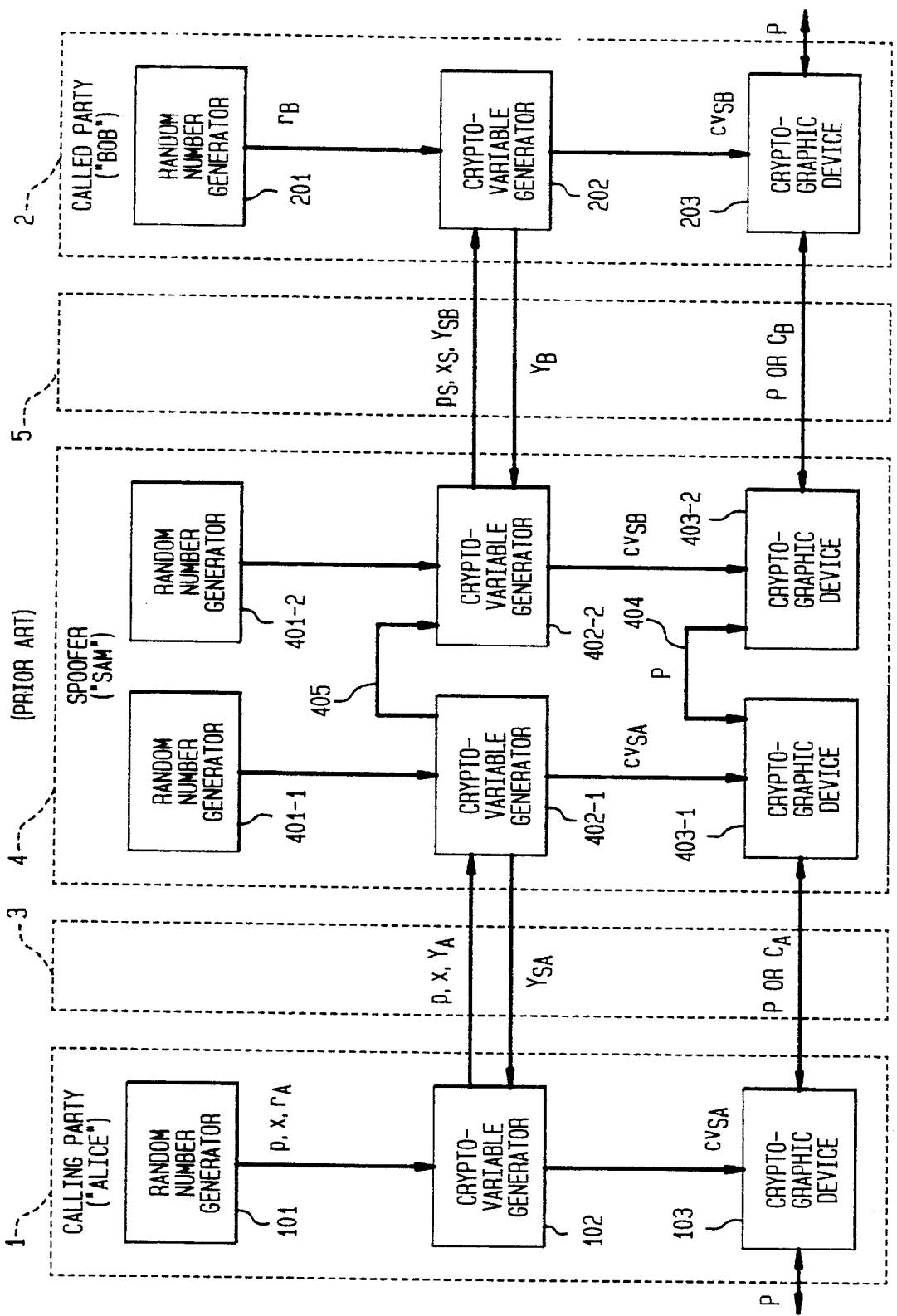
FIG. 2 schematically depicts a public-key communication system of the prior art under man-in-the-middle attack.

However, the prior-art method just discussed is vulnerable to a man-in-the-middle attack, as depicted in FIG. 2. Alice 1 attempts to place a call to Bob 2 over channel 3; a spoofer, Sam 4, intercepts Alice's call and immediately places a call to Bob over insecure channel 5. Sam is equipped with security devices analogous to Alice's and Bob's. Sam concatenates his cryptographic devices 403-1 and 403-2 by means of link 404 so that Alice and Bob perceive that they are in normal communication with each other and perceive no indication that a spoofer has intercepted their call.

As discussed in connection with FIG. 1, Alice sends p, x, and $Y_A$ over channel 3, and they are received by Sam's cryptovariable generator 402-1. Sam's cryptovariable generator 402-2 then sends $P_S$, $x_S$, and $Y_{SB}$ to Bob's cryptovariable generator 202. These may be verbatim passings-on of p, x, and $Y_A$ over link 405 as received from Alice, or they may be arbitrary coinages. $Y_{SB}$, particularly, may be assigned a trivial value (perhaps 1 or −1) by Sam in the hope that later by examination of the ciphertext encrypted with a cryptovariable cv derived from that value (which Bob will have used as $Y_A$ of FIG. 1) he will be able to "crack" Bob's secret parameter $r_B$ from examining the ciphertext C.

Similarly, Sam will return $Y_{SA}$ to Alice in lieu of $Y_B$ of FIG. 1. It is of no consequence whether Sam computes $Y_{SA}$ from p and x received from Alice and a large binary number from his random number generator 401-1, or whether he coins it arbitrarily, since Sam will not be originating any portion of the text passed in the communication between Alice and Bob and therefore has no need to protect anything. Sam may choose to make $Y_{SA}$ a trivial value, again in the hope of cracking Alice's secret parameter $r_A$ from later inspection of the ciphertext encrypted with a cryptovariable computed using that trivial value of $Y_{SA}$.

Alice and Sam both compute the same cryptovariable $cv_{SA}$ based on Alice's $Y_A$ and Sam's bogus $Y_{SA}$. When Alice initiates encryption in her cryptographic device 103 under control of that cryptovariable, she will believe that only Bob can decrypt the ciphertext $C_A$ when actually only Sam can.

Bob and Sam both compute the same cryptovariable $cv_{SB}$ based on Bob's $Y_B$ and Sam's bogus $Y_{SB}$. When Bob initiates encryption in his cryptographic device 203 under control of that cryptovariable, he will believe that only Alice can decrypt the ciphertext $C_B$ when actually only Sam can.

The plaintext of the dialogue between Alice and Bob appears on link 404; Sam decrypts ciphertext $C_A$ from Alice into plaintext P, and re-encrypts it into ciphertext $C_B$ and forwards it to Bob; Sam decrypts ciphertext $C_B$ from Bob into plaintext P, and re-encrypts it into ciphertext $C_A$ and forwards it to Alice. Sam has full access to the plaintext P on link 404, while Alice and Bob perceive no indication that anything is amiss with the conversation they believe to be secret.

Method 1: Anti-spoof variables

Figure 3:
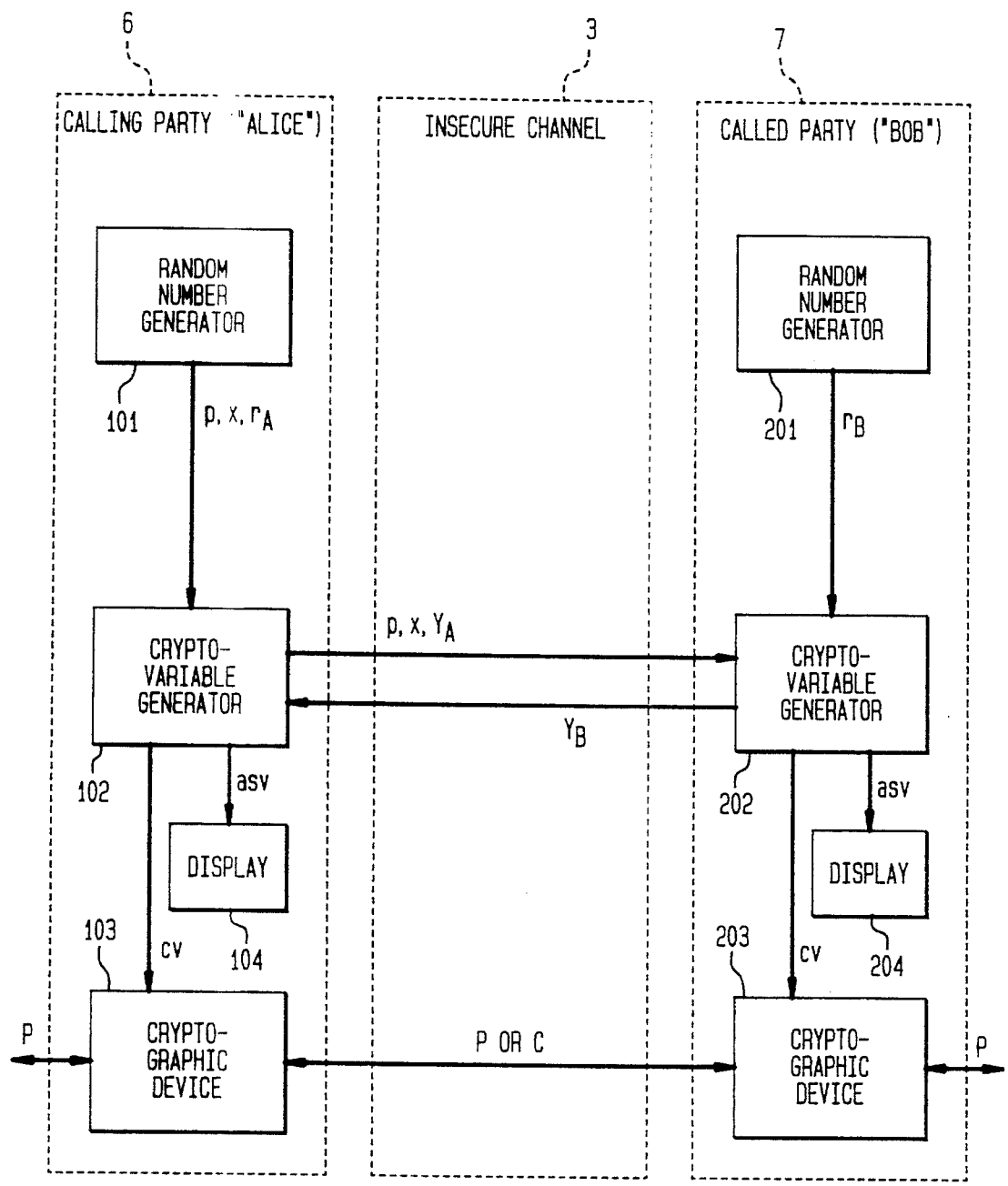
FIG. 3 depicts apparatus for defeating man-in-the-middle attack of voice communications by generating anti-spoof variables.

FIG. 3 depicts a secure communication system according to the present invention. The two parties to an intended secure communication have security devices 6, 7 according to the present invention. Security device 6, for example, is equipped with display 104 which, in a present embodiment, can display four hexadecimal digits.

The parties exchange public key information p, x, $Y_A$, and $Y_B$ and compute dh as in the prior art. As in the prior art, they compute the cryptovariable cv $cv = f_1(dh)$.

According to the present invention, they also compute the antispoof variable asv $$asv = f_2(dh)$$

where $f_2$ is a mapping from N-bit vectors to 4-digit hex vectors. Each party's antispoof variable asv is then displayed on displays 104 and 204 respectively. Absent an attack the two displays should be identical, but if an attack is in progress they will be different since the parties compute different values of dh. The parties report the displayed asv's to each other, and do not proceed with secure communication unless their asv's compare.

If Alice and Bob's call is under man-in-the-middle attack by spoofer Sam, two factors operate to preclude Sam from spoofing the asv comparison:

1. Even if Sam's security devices are according to the present invention, they will not compute the same asv for the channel between Alice and Sam as for the channel between Sam and Bob. (As discussed above, there is a very high probability that the values of dh will be different for the two channels; therefore, $asv = f_2(dh)$ will also have different values for the two channels.)
2. Although Sam, having full access to Alice and Bob's dialogue, can know when Alice and Bob are reporting their asv's, in a voice call it is virtually impossible for Sam to report his asv to Bob in such a manner that Bob is not alerted that anyone other than Alice is speaking to him, or for Sam to report his asv to Alice in like manner. Alice and Bob will thus know from the non-agreement of the asv's they report to each other that their call is under man-in-the-middle attack by a spoofer, and will terminate their call without attempting to pass any sensitive information.

If Alice and Bob split their random-component messages into two approximately equal halves, and fully transmit the first halves before transmitting the second halves, a spoofer will be precluded from mounting a birthday attack to discover their secret parameters.

Method 2: Netkeys

Figure 4:
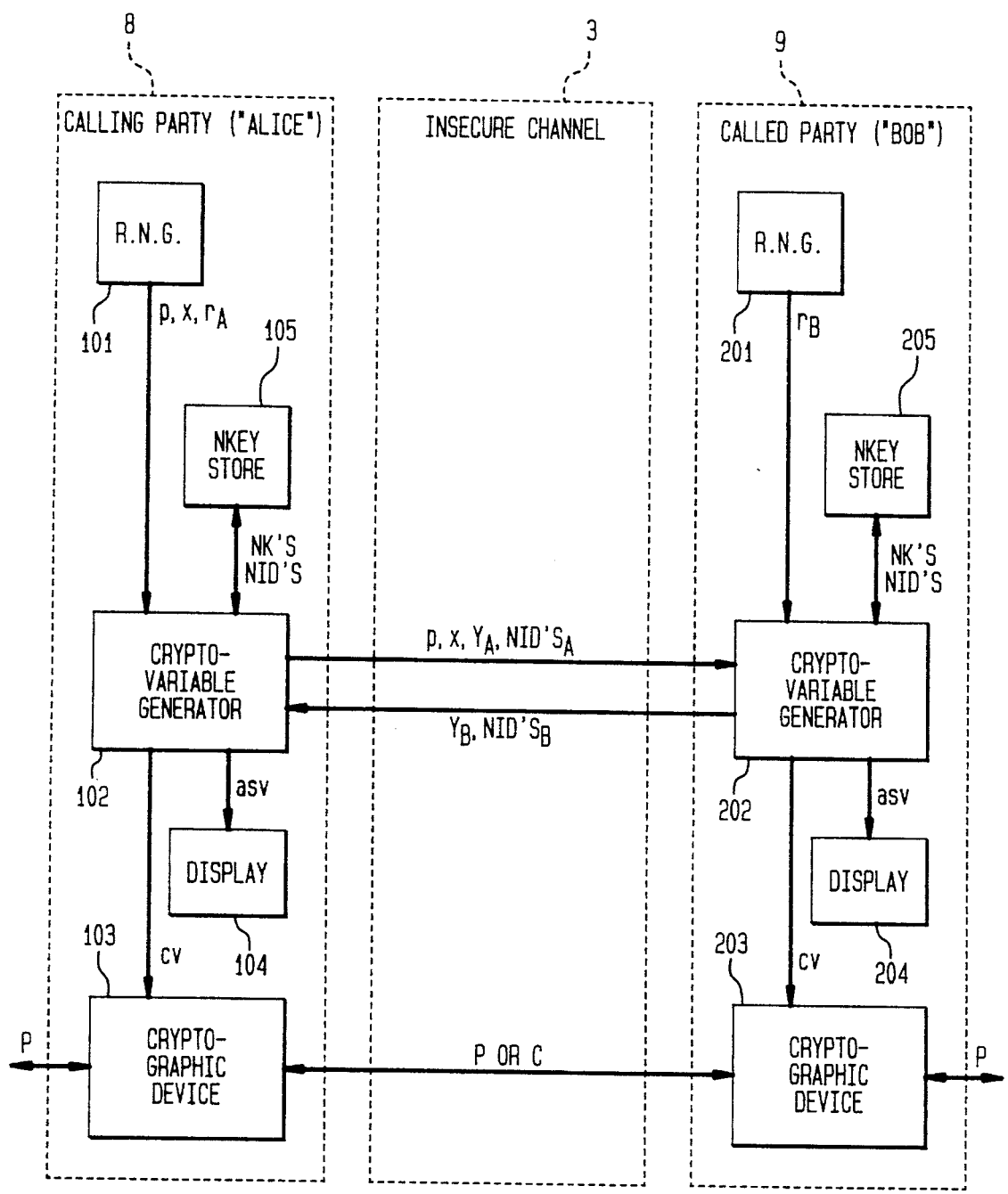
FIG. 4 depicts apparatus for defeating man-in-the-middle attack with the use of netkeys.

The asv confirmation depends on voice communication for the two parties to make positive identification of one another. Another scheme for defeating a spoofer involves a shared secret known to the two parties and not accessible to the spoofer. Referring to FIG. 4, the parties each have security devices such as device 8, which includes a netkey store 105 in which are stored secret netkeys nk indexed by netkey indices nid. Suppose that Alice and Bob want to make a secure fax call, and they find the Diffie-Hellman key exchange convenient. Concomitantly with the Diffie-Hellman exchange, they determine whether they have a netkey in common; this may be accomplished by exchanging lists of nid's, or alternatively Alice may have used the serial number of Bob's encryptor (automatically transmitted after initiation of the call) as the nid, and vice-versa for Bob. If they do have a common netkey, the common netkey is here designated $nk_c$. Then active attacks by a spoofer can be defeated if Alice and Bob compute the cryptovariable as $cv = f_3(dh, nk_c)$.

In this case, the function $f_3$ can be fairly simple (such as a projection on dh, followed by a mod-2 vector sum with nk). However, often it is advisable for this function to be a one-way hash value. This is only really necessary if dh were to be re-used, a situation that can be helpful in some protocols.

Suppose a community of secure terminal users (for voice, video, fax, or data) is broken down into independent "subnetworks" and each subnetwork is defined by a netkey, nk. Each netkey has a unique index value nid. Then when Alice calls Bob they check as described above to see if they have a common value. If so, then they can proceed with a Diffie-Hellman exchange, and use the common netkey as above. Alice and Bob can then be assured that they are each talking to someone who knows the netkey value, and is therefore "on the net." The cryptovariable, cv, is still unique to the session however, so that if someone should subsequently compromise the netkey, all previous traffic is still protected, and all future traffic is subject only to active attacks using the compromised netkey. Passive attacks will be unsuccessful. This approach will work well for all kinds of traffic (voice, data, video, FAX, etc.).

Method 2A: Using anti-spoof variables to secure the establishment of a common netkey:

There remains the matter of getting the actual common netkey to both Bob and Alice; transmitting it in the clear or over a possibly compromised secure channel should not be attempted; aforementioned alternatives, such as a courier service, are slow and expensive. The aforementioned asv verification can be used to establish a netkey in a manner not vulnerable to man-in-the-middle-attack, so that the netkey will not be compromised. Suppose that Alice and Bob have just decided to do business together and do not have a common netkey, but want to be able to send faxes securely to one another with assurance as to the source and destination of the fax plaintext. In order to establish a common netkey, Alice initiates a call to Bob using her security device 8. Her cryptovariable generator 102 determines that there is no common netkey between Alice and Bob, so it proceeds with a key exchange complete with computation and display of the asv values. Alice and Bob then speak to one another and verify the asv values; if the asv values agree, the cv value is stored as a netkey nk instead of as a cryptovariable. The fax call, and subsequent fax calls, can proceed using the netkey-based protocol. In Alice's terminal the netkey thus established can be stored and associated with a nid such as either Bob's phone number, or more properly with the serial number of Bob's FAX encryptor (which gets transmitted at the beginning of a FAX call, as noted above), and vice-versa for Bob. Alice and Bob never have to pre-arrange, or attend, another fax call.

Method 3: Certificates:

The above methods are fairly simple, can be administered with minimal overhead, and they provide closely held control. These methods are ideal for users who know one another, which is usually the case in commercial secure voice, video, and fax communications, but not always. In military communications, security will be necessary, but it is much more likely that the people at the ends of a channel have never met or spoken to one another. The commercial world appears to be evolving toward operations where secure and authenticated communications need to proceed among parties who may never have met, and who communicate entirely over data links using store and forward networks. In fact the communicating parties may not be people, but rather computerized authorizing agents that follow some fixed set credit approval mechanism that refers to bank account records and spending patterns.

Method 3 extends the security provided in Method 2 by providing the capability to authenticate at an individual key level. As in Method 2, the terminals must be loaded with key material, which contains a "certificate" that was created by a KCA (Key Certifying Authority, well known to those in the art). The certificate is a KCA-encrypted message containing the terminal's ID, public encryption key, and a parity.

Method 3 is also based on the Diffie-Hellman public key exchange. It provides an additional layer of security by providing authentication and message encryption using an RSA public key encryption method. Each terminal is populated with KCA universal vectors, a secret decryption key, and a certificate that was issued by the KCA. This certificate contains, among other things, an encrypted form of the terminal's ID and the corresponding RSA public encryption key. During the establishment of a secure communication, the two terminals exchange certificates. Using the KCA's universal vectors, the certificates are decrypted and verified. Once verified, the public encryption key can be extracted and used to encrypt messages destined for the remote terminal. Received messages are decrypted with the secret decryption key known only to the local terminal.

The bases for Method 3 key management is the RSA public encryption method whereby separate keys are used for the encryption and decryption process. Knowing one of the keys does not compromise the other. In this way, one of the keys can be made public and the other kept secret. Method 3 uses this method to provide key authentication. A KCA generates a pair of keys and selects one of them to be the decryption key. This decryption key is made public and resides in the terminals. Users send to the KCA messages that need to be certified. The KCA encrypts these messages and returns them to the user along with a parity that can be used for validation. During the establishment of a secure call, the terminals can exchange messages that have been certified by the KCA (i.e., encrypted using the secret encryption key. The received certified messages can then be decrypted and verified using the KCA public decryption key).

Since only the KCA knows how to encrypt messages, it can be said that if the decrypted certificate can be verified then the message has been authenticated (i.e., must have been encrypted by the KCA). If the message that was certified by the KCA contains a terminal's ID and public encryption key, we may pass the local terminal's public encryption key to the remote terminal and have it authenticated. The authenticated public encryption key may now be used to encrypt all messages before being transmitted. Received messages can be decrypted using the secret decryption key. This method is used to encrypt and decrypt the Diffie-Hellman key exchange methods.

For the following discussion of FIG. 5, assume $SE_{KCA}$ is the KCA's secret encryption key, $UD_{KCA}$ is KCA's public decryption key, SK is a secret decryption Key, PK is a public encryption key, TC is a certificate, ID is the terminal's ID, T is a certificate parity, X is a base number, P is a modulus, R is a random component, and H is a hash function. Given a secret random component R the corresponding public random component can calculated as $X^R$ mod P. The following notation will be used when describing the encryption and decryption of a message (M).

$SE_{KCA}(M)$ encryption of message M by KCA
$UD_{KCA}(M)$ decryption of message M encrypted by KCA
PK(M) encryption of message M via public encryption key
SK(M) decryption of message M via secret decryption key Each terminal is populated with a common KCA public decryption key, base number, modulus, and hash function (i.e., $UD_{KCA}$, X, P, and H). In addition, each terminal is populated with a unique secret decryption key and certificate (e.g., SK and TC). The certificate is a KCA-encrypted message that contains the terminal's ID, public encryption key (PK) and parity (T).

FIG. 5 shows the steps associated with Method 3 key management. Since an encrypted Diffie-Hellman key exchange is used, the first step is for each terminal to provide the other with it's public encryption key. This must be done such that the public encryption key can be authenticated (i.e., it must be verified that it came from the entity it purports to come from). This is accomplished by exchanging certificates. These certificates are decrypted and validated using the KCA public decryption key. Once validated, it can be assumed that the remote terminal is who it says it is and that the public encryption key can be used to encrypt messages. Each terminal then follows the steps associated with a Method 1 key exchange with the exception of encrypting the messages before transmission using the public encryption key of the remote terminal and decrypting the received messages using the secret decryption key of the local terminal.

For example, terminal A sends its certificate to terminal B and terminal B sends its certificate to terminal A. Terminal A decrypts and validates terminal B's certificates using the KCA public decryption key. Similarly, terminal B decrypts and validates terminal A's certificate using the KCA public decryption key. Terminal A generates a secret random component $R_a$, calculates the corresponding public component $X^{R_a}$ mod P, encrypts it using the public encryption key $PK_b$ extracted from terminal B's certificate, and transmits $PK_b(X^{R_a}$ mod P) to terminal B. Terminal B generates a secret random component $R_b$, calculates the corresponding public component $X^{R_b}$ mod P, encrypts it using the public encryption key $PK_a$ extracted from terminal A's certificate and transmits $PK_a(X^{R_b}$ mod P) to terminal A. Terminal A receives and decrypts the message, obtains terminal B's public random component $X^{R_b}$ mod P and exponentiates using its secret random component $R_a$. The result modulus P is passed over the hash function to obtain the session key. Terminal B receives and decrypts the message from terminal A, obtains terminal A's public random component $X^{R_a}$ mod P and exponentiates it using its secret random component $R_b$. The result modulus P is passed over the hash function H to obtain the session key.

A passive attack would be unsuccessful since the session key is dependent on two secret random components of which each terminal knows only one and the fact that the Diffie-Hellman messages exchanged were encrypted with the remote terminal's public encryption key. An active attack would also fail unless the secret decryption keys of both terminals were known.

Method 3a:

This method provides the user with the same capabilities as Method 3. As in Method 3, each terminal is populated with a secret random component and a certificate. However, this certificate is not encrypted by a KCA secret encryption key, but rather it is certified by the KCA via a digital signature. The certificate contains the terminal's ID, the corresponding public random component and a KCA-certified digital signature.

Method 3a is based on the pending government standard for digital signatures (DSS) and certificate-based authentication. In this scheme, the final session key is based on two separate session keys, one that authenticates the remote terminal and the other that prevents a compromise of a terminal's secret random component from compromising all past and future secure communications. The first session key $CV_1$ is based on the secret random component of the local terminal and the public random component obtained from the certificate of the remote terminal. The second session key $CV_2$ is computed using a straight Diffie-Hellman key exchange. The final session key is generated by combining the two session keys $CV_1$ and $CV_2$ as:

$$H(CV_1) + H(CV_2)$$

In order for the terminals to use this method of key management, there must be a set of public universal vectors that is generated and used by the KCA for signing certificates. These vectors are used by the terminals to verify the digital signature of certificates. Let the following represent the KCA's private vector set:

$X_{KCA}$ = an integer, where $0 < X_{KCA} < Q_{KCA}$ $K_{KCA}$ = a random integer for each signature, where $0 < K_{KCA} < Q_{KCA}$
and let the following represent the public universal vectors:

$P_{KCA}$ = prime modulus, where $2^{1023} < P_{KCA} < 2^{1024}$ $Q_{KCA}$ = prime divisor of $P_{KCA} - 1$, where $2^{159} < Q_{KCA} < 2^{160}$ $G_{KCA}$ = $h^{(P_{KCA}-1)/Q_{KCA}} \mod P_{KCA}$, $h$ is any integer, where $0 < h < P_{KCA}$ such that $h^{(P_{KCA}-1)/Q_{KCA}} \mod P_{KCA} > 1$ $Y_{KCA}$ = $G_{KCA}^{X_{KCA}} \mod P_{KCA}$ HF = Secure Hash function (SHS)

Assuming M is a message to be signed by the KCA, then the KCA's signature of M is generated by choosing a random number $K_{KCA}$ and calculating the following:

R = $(G_{KCA}^{K_{KCA}} \mod P_{KCA}) \mod Q_{KCA}$

S = $(K_{KCA}^{-1}(HF(M) + X_{KCA}R)) \mod Q_{KCA}$ $K_{KCA}^{-1}$ = the multiplicative inverse of $K_{KCA} \mod Q_{KCA}$, $(K_{KCA}^{-1} K_{KCA}) \mod Q_{KCA} = 1$, and $0 < K_{KCA}^{-1} < Q_{KCA}$ For the following discussion of FIG. 6, assume that X is a base number, P is a modulus, and H is a hash function. Terminals participating in Method 3a key management would all have a common base, modulus, KCA universal vectors, and a certificate denoted $C_{KCA}(M)$ where M is a message. This certificate contains a message M that consists of the terminal's ID, a public random component, and a digital signature. Given a secret random component R (where R is just a random number) the corresponding public random component can be calculated as $X^R \mod P$. Two public random components are exchanged for this key management scheme, one in the certificate denoted $R'_x$, and the other during a Diffie-Hellman key exchange, denoted $R_x$ (where x is either a or b). It is important to note that these random components are different and contain different values.

FIG. 6 depicts the Method 3a key management scheme. Each terminal contains a secret random component and the corresponding public random component that is a part of its certificate. The terminals begin by exchanging certificates in the clear (i.e., not encrypted). After having verified the received certificate, the remote terminal's public random component is extracted and exponentiated using the local terminal's secret random component. The result modulus P is run through the hash function H to generate the first session key. This session key is used to authenticate the remote terminal. The reasoning is that if the digital signature can be verified then the remote terminal's certificate must have been signed by the same KCA that generated the public universal vectors included in the local terminal, thus validating the remote terminal. The procedure continues with a straight Diffie-Hellman key exchange to generate a second session key. These two session keys are combined to form the final session key.

For example, terminal A transmits its certificate containing its ID, public random component, and KCA-certified digital signature:

$$ID_a, X^{R'_a} \mod P, [R_a, S_a]$$

to terminal B, and terminal B transmits its certificate:

$$ID_b, X^{R'_b} \mod P, [R_b, S_b]$$

to terminal A. Terminal A validates terminal B's certificate using:

$$0 < R_b < Q_{KCA}$$

$$0 < S_b < Q_{KCA}$$

$$w = (S_b)^{-1} \mod Q_{KCA}$$

$$u1 = ((HF(M_b)) w) \mod Q_{KCA}$$

$$u2 = ((R_b)w) \mod Q_{KCA}$$

$$v = ((G_{KCA})^{u1} (Y_{KCA})^{u2}) \mod P_{KCA}$$

$$R_b = v \mod Q_{KCA}$$

and if that holds true, it extracts terminal B's public random component $X^{R'_b} \mod P$ and exponentiates it using its secret random component $R'_a$. The result modulus P is run through the hash function H and saved as the first session key. Terminal B validates terminal A's certificate using:

$$0 < R_a < Q_{KCA}$$

$$0 < S_a < Q_{KCA}$$

$$w = (S_a)^{-1} \mod Q_{KCA}$$

$$u1 = ((HF(M_a))w) \mod Q_{KCA}$$

$$u2 = ((R_a)w) \mod Q_{KCA}$$

$$v = ((G_{KCA})^{u1} (Y_{KCA})^{u2}) \mod P_{KCA}$$

$$R_a = v \mod Q_{KCA}$$

and if that holds true, it extracts terminal A's public random component $X^{R'_a} \mod P$ and exponentiates it using its secret random component $R'_b$. The result modulus P is run through the hash function H and saved as the first session key. A second session key is generated by having both terminals continue with yet another Diffie-Hellman key exchange using different values for the public random components. The two session keys are combined to form the final session key.

Active attacks would fail unless the attacker knew the secret encryption key of the KCA in order to generate new certificates and thus masquerade as a KCA or a valid user. Since the session key is based on two sets of secret random components, a passive attack would fail unless one of the secret random components of each pair was known.

Methods suitable for use in connectionless networks will now be discussed. Each member of a user community has access to a terminal with a CPE (Customer-Premises Equipment) encryptor. Such a terminal will be referred to herein as a CBIC. Each terminal can communicate with a node having a node encryptor; such a node will be referred to as an NBIC. The node may be used to pass data between two CBIC's. The node may be operated in an unattended manner, and may thus be subject to attacks. It is literally "in the middle" and is thus vulnerable to man-in-the-middle attacks. The following methods provide authentication of the NBIC.

Method 4A:

In this method, the two terminals each essentially perform two Diffie-Hellman key exchanges; one to authenticate the NBIC and the second to prevent a compromise of the NBIC's secret random components from compromising all future and past secure communications. The NBIC's contribution to the session key is taken from a small collection of random components for which the CBICs have the corresponding public versions. In this way, the session key is generated with a secret random component known only by the NBIC.

The NBIC stores a collection of tuples each containing an ID and a secret random component $R_i$. All terminals wishing to communicate with the NBIC must store a similar collection of tuples containing an ID and a public random component $X^{R_i}$ mod P. The tuples in the CBIC and NBIC need not be the same although there must be at least one common tuple that shares the same ID in order for the two to communicate. Referring to Table 1 below, the CBIC and NBIC share the common tuple $RCID_E$ and thus could communicate with each other. The NBIC would use the secret component $R_5$ while the CBIC would use the public random component $X^{R_5}$ mod P.

TABLE 1

| CBIC Public Table (PTBL) | NBIC Secret Table (STBL) |
| --- | --- |
| $RCID_D$ :$X^{R_4}$ mod P | $RCID_A$ :$R_1$ |
| $RCID_E$ :$X^{R_5}$ mod P | $RCID_B$ :$R_2$ |
| $RCID_I$ :$X^{R_9}$ mod P | $RCID_E$ : $R_5$ |

During the establishment of a secure connection, the NBIC selects a tuple from its secret table STBL, and its corresponding RCID is transmitted to the CBIC. The CBIC uses this RCID to search its public table PTBL to obtain the NBIC's contribution to the session key, namely the corresponding public random component. The CBIC generates a secret random component, calculates its corresponding public random component and transmits that to the NBIC. The first session key $CV_1$ can then be calculated by exponentiating the corresponding public and secret random components. The justification is that the session key is generated using a public random component that would be based on one of the secret random components $\{R_1, R_2, R_5\}$ and that only the NBIC would know those values, thus authenticating the NBIC.

In order to prevent a compromise of the NBIC's secret random components from compromising all future and past recorded secure communications, another Diffie-Hellman key exchange is performed and a second session key $CV_2$ is generated. The two session keys are then combined to form the final session key. If this second Diffie-Hellman was not performed and the secret random components in the NBIC were known (compromised) then all of the information necessary to determine any session key would be available by monitoring the key exchange messages; for example, an attacker knowing $R_i$ only needs to know $X^{R_a}$ mod P to determine session key $X^{R_a R_{11}}$ mod P.

For the following discussion of FIG. 7, assume that RCID is a random component ID, X is a base number, P is a modulus, R is a random component, PTBL is a table of public random components and their associated IDs, STBL is a table of secret random components and their associated IDs, and H is a hash function. Also, assume that the $RCID_i$ is selected by the NBIC and is made available to the CBIC. The procedure is as shown in FIG. 7.

The NBIC selects an RCID and communicates that to the CBIC. The CBIC generates a secret random component $R'_a$, computes the corresponding public random component $X^{R'_a}$ mod P and sends it to the NBIC. The CBIC uses $RCID_i$ as a lookup into its public table PTBL of random components to select the NBIC's public random components while the NBIC uses the $RCID_i$ as a lookup into its secret table STBL of random components to get its secret random component. Both terminals now have enough information to compute the first session key $CV_1$.

The second session key $CV_2$ is generated by performing a straight Diffie-Hellman key exchange. The two session keys are each run through a hashing function and then combined to form the final session key. Without this second Diffie-Hellman key exchange, a compromise of the NBIC's secret random components would compromise all past and future secure communications since all of the information necessary to determine any session key is either known or can be obtained by monitoring the key exchange messages. This method has the advantage of being relatively simple to implement. Disadvantages are that only a fixed number of public random components can be stored; if a terminal has no provision for reloading of keying information, once the collection of public random components and/or base and modulus have been compromised the terminal must be recalled. Also, the amount of time required to establish a secure connection is essentially doubled.

Method 4B:

Method 4B is essentially an asymmetric version of Method 3 (discussed above) whereby messages transmitted from the CBIC to the NBIC are encrypted via RSA public encryption techniques (well known in the prior art) for the purpose of authenticating the NBIC. All messages sent to the NBIC during a Diffie-Hellman key exchange are encrypted by the CBIC using the NBIC's public encryption key (PK). Diffie-Hellman key exchange messages received by the NBIC are decrypted using the secret decryption key (SK).

For the following discussion of FIG. 8, assume that $SE_{KCA}$ is the KCA's secret encryption key, $UD_{KCA}$ is the KCA's public decryption key, PK is a public encryption key, SK is a secret decryption key, C is a certificate, T is a certificate parity, X is a base number, P is a modulus, R is a random component and H is a hash function. The following notation is used when describing the encryption/decryption of a message (M):

$SE_{KCA}(M)$ encryption of message M by KCA
$UD_{KCA}(M)$ decryption of message M encrypted by KCA
$PK(M)$ encryption of message M via public encryption key
$SK(M)$ decryption of message M via secret decryption key Each terminal is populated with a common KCA public decryption key, base number, modulus and hash function (i.e. $UD_{KCA}$, X, P, and H). In addition, the NBIC is populated with a unique secret decryption key and certificate (e.g. SK and TC). The certificate is a KCA-encrypted message that contains the terminal's ID, public encryption key (PK) and parity (T). FIG. 5 shows the steps associated with Method 3 key management, of which Method 4b is essentially an asymmetric version as mentioned above.

FIG. 8 depicts the operation of Method 4b key management. During the establishment of a secure connection, the NBIC transmits its certificate to the CBIC which then decrypts the certificate using the KCA's public universal decryption key $UD_{KCA}$, and extracts the terminal $Id_b$, public encryption key $PK_b$, and parity $T_b$. The CBIC validates the decrypted certificate by performing a set of checks using the parity $T_b$. It is assumed that only the KCA knows how to encrypt the certificate $C_b$ via the KCA secret encryption key $SE_{KCA}$, but that everyone knows how to decrypt the $C_b$ via the KCA public decryption key $UD_{KCA}$. Once the certificate has been verified and the public encryption key $PK_b$ extracted, the setup continues with a Diffie-Hellman key exchange whereby the messages from the CBIC to the NBIC are encrypted using the public encryption key extracted ($PK_b$) from the NBIC's certificate. The NBIC node decrypts received messages using its secret decryption key ($Sk_b$). Messages transmitted by the NBIC are not encrypted nor are messages received by the CBIC decrypted since, as noted, this is an asymmetric method.

The reason behind transmitting the public encryption key at setup is to allow for the public and secret encryption keys of the NBIC to be changed without requiring a corresponding change in the CBIC. However, at the expense of flexibility, the public encryption key $PK_b$ of the NBIC could just as easily be hardcoded into the CBIC terminal thus avoiding the need to receive and decrypt the NBIC's certificate.

Method 4b provides the advantage of providing Method 3 authentication of the unattended NBIC with no need for storing netkeys in the CBIC (just the universal decryption key $UD_{KCA}$). It has the disadvantage of requiring the CBIC to perform a Diffie-Hellman and an RSA public key encryption.

Method 4c.

Method 4c key management is essentially an asymmetric version of the Method 3a key management (discussed above whereby a double Diffie-Hellman is performed and the initial random component message transmitted by the NBIC to the CBIC has been certified by a KCA (i.e., contains a digital signature) and is used for the purpose of authenticating the NBIC. Again, for the same reasons stated above, a second Diffie-Hellman is performed to prevent a compromise of the NBIC's secret random components from compromising all past and future secure communications.

The CBIC generates the first session key $CV_1$ by exponentiating the certified public random component of the NBIC ($X^{R'_b}$ mod P) to that of its random component ($R'_a$). The NBIC generates the first session key $CV_1$ by exponentiating the public random component of CBIC ($X^{R'_a}$ mod P) to that of its secret random component ($R'_b$). The second session key $CV_2$ is computed using a straight Diffie-Hellman key exchange. The final session key is generated from the two session keys $CV_1$ and $CV_2$ as $$H(CV_1)+H(CV_2)$$

In order for a terminal to use this method of key management, it must contain a set of public universal vectors that is generated and used by the KCA for signing certificates. These universal vectors are used by the terminals to verify the digital signature of certificates. Let the following represent the KCA's private vector set:

$$X_{KCA} = \text{an integer, where } 0<X_{KCA}<Q_{KCA}$$

$$K_{KCA} = \text{a random integer, different for each signature,}$$

where $0<K_{KCA}<Q_{KCA}$ and the following represent the public universal vectors:

$P_{KCA}$ = prime modulus, where $2^{1023} < P_{KCA} < 2^{1024}$ $Q_{KCA}$ = prime divisor of $P_{KCA} - 1$, where $2^{159} < Q_{KCA} < 2^{160}$ $G_{KCA}$ = $h^{(P_{KCA}-1)/Q_{KCA}}$ mod $P_{KCA}$, h is any integer, where $0 < h < P_{KCA}$ such that $h^{(P_{KCA}-1)/Q_{KCA}}$ mod $P_{KCA} > 1$ $Y_{KCA}$ = $G_{KCA}^{X_{KCA}}$ mod $P_{KCA}$ HF = Secure Hash function (SHS)

Assuming M is a message to be signed by the KCA, then the KCA's signature of M is generated by choosing a random number $K_{KCA}$ and calculating the following:

R = $(G_{KCA}^{K_{KCA}}$ mod $P_{KCA})$ mod $Q_{KCA}$

S = $(K_{KCA}^{-1}(HF(M) + X_{KCA}R))$ mod $Q_{KCA}$ $K_{KCA}^{-1}$ = the multiplicative inverse of $K_{KCA}$ mod $Q_{KCA}$, $(K_{KCA}^{-1} K_{KCA})$ mod $Q_{KCA} = 1$, and $0 < K_{KCA}^{-1} < Q_{KCA}$ For the following discussion of FIG. 9, assume that X is a base number, P is a modulus, and H is a hash function. Terminals participating in Method 4c key management would all have a common base, modulus, hash function, and KCA universal vectors. In addition, each node would contain a certificate denoted $C_{KCA}(M)$ where M is a message, and a random component associated with that certificate. This certificate contains a message M that consists of the terminal's ID, a public random component, and a digital signature. Given a secret random component R (where R is just a random number) the corresponding public random component can be calculated as $X^R$ mod P. Two random components are exchanged for this key management scheme, one in the certificate denoted $R'_x$, and the other during a Diffie-Hellman key exchange, denoted $R_x$ (where x is either a or b). It is important to note that these random components are different and contain different values.

FIG. 9 depicts the Method 4c key management scheme. The procedure begins with the NBIC sending its certificate in the clear (i.e., not encrypted) to the CBIC. This certificate consists of the NBIC's ID, public random component and a KCA-generated digital signature (i.e., $\{ID_b: X^{R'_b}$ mod P: $\{R_b, S_b\}\}$). The CBIC validates the certificate by verifying that the following are satisfied:

$$0 < R_b < Q_{KCA}$$

$$0 < S_b < Q_{KCA}$$

$$w = (S_b)^{-1} \bmod Q_{KCA}$$

$$u1 = ((HF(M_b))w) \bmod Q_{KCA}$$

$$u2 = ((R_b)w) \bmod Q_{KCA}$$

$$v = ((G_{KCA})^{u1} (Y_{KCA})^{u2}) \bmod P_{KCA}$$

$$R_b = v \bmod Q_{KCA}$$

Once verified, the CBIC extracts the NBIC's public random component ($X^{R'_b} \bmod P$). The CBIC then generates a secret random component ($R'_a$), computes the public random component ($X^{R'_a} \bmod P$) and sends it to the NBIC. At this point both terminals have enough information to generate the first session key $CV_1$. The CBIC takes the public random component that was extracted from the NBIC's certificate ($X^{R'_b} \bmod P$) and exponentiates it using its secret random component ($R'_a$) and saves it as the first session key. The NBIC takes the public random component that was received from the CBIC ($X^{R'_a} \bmod P$) and exponentiates it using secret random component ($R'_b$) and saves it as the first session key. The second session key ($CV_2$) is generated by having both terminals continue with yet another Diffie-Hellman key exchange using different values for the secret random components and thus different values for the public random components. The final session key is calculated from a combination of $CV_1$ and $CV_2$.

This method provides the advantages of Method 3a authentication of the unattended terminal with no need for storing netkeys in the CBIC; ability to change secret and public random components of the unattended terminal without the need to change the CBICs; generation of the session key is derived from the largest possible set (i.e., both random components are truly random, not fixed as in Method 4a). A disadvantage is that it requires performing two Diffie-Hellmans.

One skilled in the art will appreciate that the invention may be embodied in yet other specific forms without departing from the spirit thereof. The invention is intended to be embraced by the appended claims and not limited by or to the foregoing embodiments.

What is claimed is:

1. In a communication system of the type in which a node may receive messages from any of a plurality of terminals and may forward any such message to any other of said plurality of terminals, the node and the terminals being equipped with data storage means and with computation means, a method for securing communications therewithin, comprising the steps of:

a. storing, at both the node and at a communicating terminal of said plurality of terminals, a set of universal vectors obtained from a Key Certification Authority (KCA):

b. transmitting from the node to the communicating terminal a node certificate obtained from said KCA, said node certificate including a KCA-certified digital signature, a node public key and a terminal identification (ID);

c. verifying in the communicating terminal, from the set of universal vectors stored thereat that the node certificate was obtained from the KCA;

d. retrieving a terminal secret key in the communicating terminal and generating therefrom in the communicating terminal a terminal public key;

e. transmitting the terminal public key from the communicating terminal to the node;

f. computing in the communicating terminal a first session cryptovariable from said node public key and from the terminal secret key;

g. computing in the node said first session cryptovariable from said terminal public key and from a node secret key associated with the node certificate;

h. performing a public key exchange between the node and the communicating terminal and computing therefrom in the node and in the communicating terminal a second session cryptovariable;

i. computing in the node and in the communicating terminal a common session key from said first session cryptovariable and said second session cryptovariable; and j. encrypting and decrypting messages exchanged between said node and said communicating terminal using said common session key.

2. In a communications system of the type in which any of a plurality of terminals may exchange messages with any other of said plurality of terminals, a method for securing communications therewithin, comprising the steps of:

storing at first and second terminals of said plurality of terminals, respective first and second secret keys, and respective first and second terminal certificates issued by a Key Certification Authority (KCA), each said terminal certificate including a KCA-certified digital signature, a public key, and a terminal identification (ID);

storing a set of KCA universal vectors at each said terminal;

transmitting said first terminal certificate from said first terminal to said second terminal;

transmitting said second terminal certificate from said second terminal to said first terminal;

verifying at said first and second terminals, using the set of universal vectors, that the second and first terminal certificates, respectively, were generated by the KCA;

computing, upon verification in the verifying step, a first cryptovariable at said first terminal from said first secret key and from said public key of said second terminal certificate, and at said second terminal from said second secret key and from said first public key of said first terminal certificate;

performing another public key exchange between said first and second terminals and computing therefrom a second cryptovariable;

computing in said first and second terminals a common session key from said first and second cryptovariables; and encrypting and decrypting messages exchanged between said first and second terminals, using said common session key.

3. The method according to claim 2, wherein the asv is reported vocally in the reporting step.

4. The method according to claim 2, wherein said asv is a four digit hexadecimal vector.

5. The method according to claim 2 further comprising the steps of:

computing, at each of said first and second terminals, a cryptovariable cv as a function of dh, where cv is a mapping of the N-bit vector dh to a binary vector of length K, where K is less than N; and encrypting messages to be exchanged with the cryptovariable cv at each said first and second terminals, if the asv computed favorably compares with the asv reported in the comparing step; and decrypting the exchanged messages at said first and second terminals using cv.

6. The method according to claim 2, wherein said first terminal is a node.

7. In a secure communications system of the type in which a first terminal may exchange messages with at least a second terminal, with the first and second terminals having respective first and second public keys and first and second associated secret keys, respectively, wherein said first terminal computes a secure key dh as a function of said second public key and said first secret key, said second terminal computing said secure key dh as a function of said first public key and said second secret key, wherein said secure key dh is an N-bit binary vector, a method for securing communication between said first and second terminals, comprising the steps of:

computing, at each of said first and second terminals, an anti-spoof variable asv as a function of dh, where asv is a mapping from the N-bit vector dh to a hexadecimal vector;

reporting, by said first terminal, the asv computed at said first terminal to said second terminal;

comparing at said second terminal, the asv computed at said second terminal with the asv reported by said first terminal;

proceeding with secure communications only if the asv computed favorably compares with the asv reported in the comparing step.

8. In a secure communications system of the type in which a first terminal may exchange messages with at least a second terminal, with the first and second terminals having respective first and second public keys and first and second associated secret keys, respectively, wherein said first terminal computes a secure key dh as a function of said second public key and said first secret key, said second terminal computing said secure key dh as a function of said first public key and said second secret key, a method for securing communication between said first and second terminals, comprising the steps of:

storing at said first terminal, a first list of secret codewords;

storing at said second terminal, a second list of secret codewords;

exchanging said first and second lists of secret codewords between said first and second terminals;

comparing, at said first and second terminals, the codewords of said first and second lists to determine if a common codeword exists on said lists;

computing, if said common codeword is determined to exist in said comparing step, a cryptovariable cv at each of said first and second terminals, as a function of dh and said common codeword;

encrypting messages to be exchanged with the cryptovariable cv at each said first and second terminals; and decrypting the exchanged messages at said first and second terminals using cv.

9. The method according to claim 8, wherein cv is computed as a one-way hash value.

10. The method according to claim 8, wherein said at least a second terminal comprises a plurality of secure terminals, each of said secure terminals having stored thereat said second list of secret codewords, said second list of secret codewords referred to as a netkey, wherein any of said secure terminals are capable of computing said cryptovariable cv as a function of dh and said netkey, so that secure communications between said first terminal and any of said secure terminals can occur via message encryption and decryption using cv.

* * * * *